United States Patent [19]
Walker et al.

[11] Patent Number: 6,108,639
[45] Date of Patent: Aug. 22, 2000

[54] CONDITIONAL PURCHASE OFFER (CPO) MANAGEMENT SYSTEM FOR COLLECTIBLES

[75] Inventors: Jay S. Walker, Ridgefield; Andrew S. Van Luchene, Norwalk, both of Conn.

[73] Assignee: priceline.com Incorporated, Stamford, Conn.

[21] Appl. No.: 08/964,967

[22] Filed: Nov. 5, 1997

Related U.S. Application Data

[63] Continuation-in-part of application No. 08/889,319, Jul. 8, 1997, which is a continuation-in-part of application No. 08/707,660, Sep. 4, 1996, Pat. No. 5,794,207.

[51] Int. Cl.[7] .................................................. G06F 17/60
[52] U.S. Cl. ................................ 705/26; 705/27; 705/37
[58] Field of Search ............................... 705/1, 26, 27, 705/35, 37, 38, 39; 235/375, 379, 380, 381; 379/90.01; 340/825.26, 825.27, 825.28, 825.29; 402/22, 24

[56] References Cited

U.S. PATENT DOCUMENTS

| | | | |
|---|---|---|---|
| 3,573,747 | 4/1971 | Adams et al. | 705/37 |
| 4,247,759 | 1/1981 | Yuris et al. | 235/381 |

(List continued on next page.)

FOREIGN PATENT DOCUMENTS

| | | | |
|---|---|---|---|
| 96/34356 | 10/1996 | WIPO. | |
| WO 96/34356 | 10/1996 | WIPO | G06F 17/60 |
| 97/46961 | 12/1997 | WIPO. | |

OTHER PUBLICATIONS

Koepper, Ken, "Room Inventory Auctioning: The Next CRS Generation", Lodging, Jan. 1990 at p. 26, 29–30.
Fiskin, Ken, Foresight Exchange Tutorial: (http://www.id-eosphere.com/fx/docs/tutorial.html) Feb. 19, 1999 at p. 1–5.
"Bid.com 1998 Third–Quarter Revenue Increases 12.5 Percent From Second Quarter", Business Wire, Oct. 29, 1998.
Final Report: Virtual Hospital (http://www.telemed.medad-min.uiowa.edu/TRCDocs/Pubs/FinalReport/cVirtualH/vir-tualH/virtual h02.html), download date: Sep. 20, 1998.
"First Source Become a Member", More Reasons to Join First Source? (http://www.fsource.com/bene.html), download date: Sep. 20, 1998.
Jeffrey Davis, "Big Storm rising", Business 2.0, Sep., 1998 at p. 60.
Suite 101.com (http://www.suite101.com/doc.cfm.presskit/questions), 1998.

(List continued on next page.)

*Primary Examiner*—Stephen R. Tkacs
*Attorney, Agent, or Firm*—Morgan & Finnegan, L.L.P.; Jeffrey L. Brandt

[57] ABSTRACT

A collectible conditional purchase offer (CPO) management system is disclosed for receiving and processing individual CPOs from buyers for one or more collectibles, such as coins, stamps, art prints, comic books, baseball cards, jewelry, or other used or secondary market goods. The collectible CPO management system processes each received CPO to determine whether one or more sellers are willing to accept a given collectible CPO. If a seller accepts a given CPO, and ultimately delivers goods complying with the buyer's CPO, the buyer is bound on behalf of the accepting seller, to form a legally binding contract. The CPO is guaranteed, for example, by a general-purpose account, such as a credit or debit account. Once a CPO is accepted by a seller, but before completing the transaction, the goods are preferably forwarded to a dealer/authenticator for evaluation. The dealer/authenticator preferably validates, authenticates and optionally guarantees the goods, while also serving as the distribution point for the collectibles sold by the collectible CPO management system. In order to ensure that at least one of the accepting sellers will have the collectible item in the condition specified by the buyer, a number of sellers may conditionally accept each CPO. Each of the accepting seller(s) are preferably prioritized into a hierarchy based on predetermined criteria.

30 Claims, 16 Drawing Sheets

U.S. PATENT DOCUMENTS

| | | | |
|---|---|---|---|
| 4,449,186 | 5/1984 | Kelly et al. | 705/5 |
| 4,553,222 | 11/1985 | Kurland et al. | 705/15 |
| 4,677,552 | 6/1987 | Sibley, Jr. | 705/37 |
| 4,751,728 | 6/1988 | Treat | 379/113 |
| 4,789,928 | 12/1988 | Fujisaki | 705/37 |
| 4,799,156 | 1/1989 | Shavit et al. | 705/26 |
| 4,903,201 | 2/1990 | Wagner | 705/37 |
| 4,931,932 | 6/1990 | Dalnekoff et al. | 705/5 |
| 5,021,953 | 6/1991 | Webber et al. | 705/6 |
| 5,136,501 | 8/1992 | Silverman et al. | 705/37 |
| 5,168,446 | 12/1992 | Wiseman | 705/37 |
| 5,191,523 | 3/1993 | Whitesage | 705/6 |
| 5,191,613 | 3/1993 | Graziano et al. | 380/25 |
| 5,224,034 | 6/1993 | Katz et al. | 705/7 |
| 5,243,515 | 9/1993 | Lee | 705/37 |
| 5,253,165 | 10/1993 | Leiseca et al. | 705/5 |
| 5,262,941 | 11/1993 | Saladin et al. | 705/38 |
| 5,283,731 | 2/1994 | Lalonde et al. | 705/1 |
| 5,297,031 | 3/1994 | Gutterman et al. | 705/37 |
| 5,329,589 | 7/1994 | Fraser et al. | 379/91.02 |
| 5,361,199 | 11/1994 | Shoquist et al. | 705/26 |
| 5,404,291 | 4/1995 | Kerr et al. | 705/5 |
| 5,420,914 | 5/1995 | Blumhardt | 379/114 |
| 5,426,281 | 6/1995 | Abecassis | 235/379 |
| 5,444,630 | 8/1995 | Dlugos | 705/402 |
| 5,467,269 | 11/1995 | Flaten | 705/14 |
| 5,500,793 | 3/1996 | Deming, Jr. et al. | 705/37 |
| 5,517,555 | 5/1996 | Amadon et al. | 455/408 |
| 5,519,769 | 5/1996 | Weinberger et al. | 379/112 |
| 5,553,131 | 9/1996 | Minervino, Jr. et al. | 379/221 |
| 5,557,517 | 9/1996 | Daughterty, III | 705/37 |
| 5,557,518 | 9/1996 | Rosen | 380/24 |
| 5,570,283 | 10/1996 | Shoolery et al. | 705/5 |
| 5,592,375 | 1/1997 | Salmon et al. | 705/7 |
| 5,606,602 | 2/1997 | Johnson et al. | 379/115 |
| 5,611,052 | 3/1997 | Dykstra et al. | 705/38 |
| 5,615,269 | 3/1997 | Micali | 380/49 |
| 5,664,115 | 9/1997 | Fraser | 705/37 |
| 5,689,652 | 11/1997 | Lupien et al. | 705/37 |
| 5,694,551 | 12/1997 | Doyle et al. | 705/26 |
| 5,696,965 | 12/1997 | Dedrick | 707/10 |
| 5,717,989 | 2/1998 | Tozzoli et al. | 705/37 |
| 5,732,400 | 3/1998 | Mandler et al. | 705/26 |
| 5,745,882 | 4/1998 | Bixler et al. | 705/26 |
| 5,757,917 | 5/1998 | Rose et al. | 380/25 |
| 5,758,328 | 5/1998 | Giovannoli | 705/26 |
| 5,794,207 | 8/1998 | Walker et al. | 705/1 |
| 5,794,219 | 8/1998 | Brown | 705/37 |
| 5,797,127 | 8/1998 | Walker et al. | 705/5 |
| 5,799,285 | 8/1998 | Klingman | 705/26 |
| 5,826,244 | 10/1998 | Huberman | 705/37 |
| 5,832,452 | 11/1998 | Schneider et al. | 705/5 |
| 5,835,896 | 11/1998 | Fisher et al. | 705/37 |
| 5,845,265 | 12/1998 | Woolston | 705/37 |

OTHER PUBLICATIONS

Web Marketing Today (http://www.wilsonweb.com.com/rf-wilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

Hapgood, Fred bidder Harvest, Sep. 1997, p. 58.

HomeShark: Refinance Check, selected pages downloaded from www.homeshark.com on Aug. 13, 1997.

The Loan Process, downloaded from www.sdtech.com/mls/process on Aug. 7, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicom.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Bryant, Adam, "Shaking Up Air Fares+ Status Quo", The New York Times, Mar. 31, 1997.

Silverman, Robert, "GM Drives Wed Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web: ETA to Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C878 ALI–ABA 335, Dec. 9, 1993.

Hainer, Cathy and Grossman,Cathy Lynn, "Where Vacationing Kids Get Good Care", USA Today, Apr. 1, 1992, at p. 4D.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.
"Buy Low, Fly High", USA Today, Nov. 14, 1991 at p. 15.
Traveler's Notes; Easier Airfare Bidding, Consumer Reports Travel Letter, Oct. 1991 at p. 119.
Nelson, Janet "Practical Traveler; Airlines Relaxing on No–Refund Tickets", The New York Times, Sep. 22, 1991 at p. 3 of Section 5.
Pelline, Jeff, "New Service; Now You Can Make a Bid on Your Next Airline Ticket Home", The Orange County Register, Sep. 1, 1991 at p. E01.
"Bookit Airfare Bidding System (Fax for Your Plane Ticket?)", Consumer Reports Travel Letter, Sep. 1991, pp. 97 & 106.
Upton, Kim "French Say Monoliths Off–limits to Visitors", Los Angeles Times, Aug. 25, 1991.
Carey, Christopher, "Firm Offers Auction for Airline Tickets", St. Louis Post–Dispatch, Aug. 7, 1991 at p. 1B.
NASDAQ Adds Enhancements to SOES Limit Order File, Securities Week, Nov. 26, 1990, p. 5.
Ritter, Jeffrey B., "Scope of the Uniform Commercial Code: Computer Contracting Cases and Electrical Commercial Practices", 45 Bus. Law 2533, Aug., 1990.
Greenburg, Peter, S., "Judging DeRegulation", The Record, Jul. 22, 1990 at p. T01.
Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.
Wallace, David, "Company Planning to Let Fliers Bid on Airfares", Philadelphia Business Journal, Mar. 26, 1990 at p. 15.
"Letter to Business Extra", The San Francisco Chronicle, Dec. 26, 1989 at p. C7.
Schrage, Michael Innovation/Micheal Schrage: Laboratory Experiments with Market Economics, Los Angeles Times, Nov. 23, 1989 at p. D1.
Del Rosso, Laura, Firm Proposes ticket–bidding system; Marketel explores electronic auction of travel; Marketel International., Travel Weekly, Section No. 91, vol. 91, vol. 48, p. 1; Nov. 13, 1989.
Carlsen, Clifford, "Polaris Group Set to Fly the Leveraged Sky", San Francisco Business Times, Nov. 6, 1989 at p. 1.
Carlsen, Clifford, "From Airline Tickets to Human Organs, the Electronic Markets Are Booming", San Francisco Business Times, Aug. 14, 1989 at p. 17.
"Public May Submit Bids To Get Bargain Rates", Wall Street Journal, Section 2; p. 1, col. 1; Aug. 1, 1989.
American Airlines Internet Silent Auction, selected pages downloaded from www.americanair.com.
Apollo Host Computer, selected pages downloaded from www.appollo.com.
"Auctioning unsold airline tickets." (http://www.newciv.org/GIB/BOV/BV–409.HTMI), at p. 1.

Cathay Pacific:CyberTraveler Auction #3—Official Rules, selected pages downloaded from www.cathaypacific.com.
Sabre Decision Technologies, selected pages downloaded from www.sabre.com.
PhoneMiser: Frequently Asked Questions, downloaded from www.phonemiser.com .
The United Computer Exchange: How It All Works, selected pages downloaded from www.uce.com.
Tired of Shopping for the Best Home Loan?, Mortgage Loan Specialists.
About IAO, selected pages downloaded from www.iaoauction.com on Sep. 8, 1997 and Sep. 18, 1997.
Classifieds2000: The Internet Classifieds, selected pages downloaded from www.classifieds2000.com on Aug. 6, 1997.
CSM Online: About Collector's Super Mall downloaded from www.csmonline.com (Jul. 23, 1996).
CyberBid, Net Fun Ltd. (1996).
Laura Del Rosso, Marketel Says It Plans to Launch Air Fare 'Auction' in June; Marketel International, Inc., Travel Weekly, Apr. 29, 1991, at 1.
Laura Del Rosso, Ticket–Bidding Firm Closes its Doors; Marketel International, Inc., Travel Weekly, Mar. 12, 1992, at 1.
Fran Golden, AAL'S Riga Doubts Marketel's Appeal to Retailers; Chris Riga of American Airlines, Travel Weekly, Nov. 13, 1989, at 4.
Robert Kuttner, Computers May Turn the World Into One Big Commodities Pit, Business Week, Sep. 11, 1989, at 17.
NASDAQ Consolidated Subscriber Agreement, downloaded from www.pcquote.com/exchanges on Aug. 15, 1997.
NASDAQ: What Is NaSDAQ?, selected pages downloaded from http://home.axford.com on Aug. 15, 1997.
Onsale: Auction Supersite, selected pages downloaded from www.onsale.com on Sep. 8, 1997.
Jeff Pelline, Travelers Bidding on Airline Tickets; SF Firm Offers Chance for Cut Rate Fares, The San Francisco Chronicle, Aug. 19, 1991, (News) at A4.
J. Kelsey and B. Schneier, Conditional Purchase Orders, 4th ACM Conference on Computer and Communications Security, ACM Press, 117–124 (Apr. 1997).
Michael Schrage, An Experiment In Economic Theory; Labs Testing Real Markets, The Record, Nov. 26, 1989, (Business) at B01.
Sotheby's: General Information, downloaded from www.sothebys.com (1996).
The United Computer Exchange: How It All Works, selected pages downloaded from www.uce.com on Jul. 23, 1997.
Trade–Direct: We Help You Trade With Confidence, selected pages downloaded from www.trade–direct.com on Aug. 6, 1997.
TradingFloor: General Trading Information and Terms, downloaded from www.tradingfloor.com on Aug. 14, 1997.

| BUYER IDENTIFIER 330 | BUYER NAME 335 | BUYER ADDRESS 340 | BUYER E-MAIL 345 | BUYER GENERAL-PURPOSE ACCOUNT IDENTIFIER 350 |
|---|---|---|---|---|
| 16789 | BILL SMITH | 42 PINK ST. SANTA FE, NM 87501 | SMITH@ ANYWHERE.COM | 1111-1111-1111-1111 |
| 16790 | JILL JANSON | 1 RED DR. COLUMBUS, OH 21501 | JJANSON@ AOL.COM | 1111-2222-2222-2222 |
| 16791 | JOE SILVER | 2178 BIG LOOP DR. PHOENIX, AZ 85062 | SILVER@ WEBTV.NET | 4444-4444-4444-4444 |

| SELLER IDENTIFIER 430 | SELLER NAME 435 | SELLER ADDRESS 440 | SELLER CONTACT INFORMATION 445 | SELLER GENERAL-PURPOSE ACCOUNT IDENTIFIER 450 |
|---|---|---|---|---|
| 16789 | DAN STREEPER | 92 BLUE ST. SANTA FE, NM 87501 | SMITH@WHEREVER.COM | 3333-1111-1111-1111 |
| 21879 | SUSAN GREEN | 7891 RED CIR. SANTA FE, NM 87501 | GREEN@NEXIS.COM | 2222-2222-2222-2222 |
| 28691 | DENNIS BROWN | 111 DUNN ST. LOS ANGELES, CA 12589 | DBROWN@WEBTV.NET | 3333-3333-3333-3333 |

| ITEM CLASS IDENTIFIER 640 | ITEM CLASS DESCRIPTION 650 |
|---|---|
| CN | CURRENCY NOTES |
| NU | NUMISMATICS |
| PH | STAMPS |
| BB | BASEBALL CARDS |
| CB | COMIC BOOKS |

| OFFER NUMBER 722 | BUYER ID 724 | SELLER 1 726 | SELLER 2 728 | DATE POSTED 730 | DATE FILLED 732 | CURRENT STATUS 734 | OFFER AMOUNT 736 | COUNTER-OFFER AMOUNT 738 |
|---|---|---|---|---|---|---|---|---|
| 0001 | 12345 | NA | NA | 8/12/97 | NA | PENDING | $75.00 | NA |
| 0002 | 12250 | 45678 | NA | 8/10/97 | NA | UNFILLED | $82.00 | NA |
| 0003 | 16789 | 21897 | 28691 | 8/09/97 | 8/09/97 | FILLED | $179.00 | NA |
| 0004 | 12170 | NA | NA | 8/09/97 | NA | CLOSED | $27.00 | $40.00 |

← 700

705 →
710 →
715 →
720 →

| ITEM CLASS ID 742 | ITEM DESCRIPTION 744 | CONDITION 746 | DATE OF AUTHENTICATION 748 | AUTHENTICATOR ID 750 | MAILED ITEM 1 752 | MAILED ITEM 2 754 | FINAL ITEM NUMBER SOLD 756 | FINAL SELLER 758 |
|---|---|---|---|---|---|---|---|---|
| CN | 1862 CONFEDERATE $500 BILL | UNC | NA | NA | NA | NA | NA | NA |
| NU | 3 PC. STATUE OF LIBERTY COMEMORATIVE SET | NA | NA | NA | NA | NA | NA | NA |
| NU | 1863 $2 1/2 GOLD PIECE | VF+ | 8/15/97 | 557890 | 001 | 003 | 003 | 28691 |
| NU | 1899 CC MORGAN DOLLAR | M5-63 | NA | NA | NA | NA | NA | NA |

FIG. 7

| ITEM IDENTIFIER 820 | SELLER IDENTIFIER 825 | ITEM CLASS 830 | POSTING DATE 835 | DESCRIPTION 840 | QUALITY GRADE 845 | MINIMUM OFFER PRICE 850 |
|---|---|---|---|---|---|---|
| 001 | 21879 | NU | 7/16/97 | 1863 $2 1/2 GOLD PIECE | VF+ | NA |
| 002 | 22521 | NU | 5/24/97 | 1863 $2 1/2 GOLD PIECE | VF+ | $190.00 |
| 003 | 28691 | NU | 8/10/97 | 1863 $2 1/2 GOLD PIECE | VF+ | NA |

FIG. 8

CONDITIONAL PURCHASE OFFER (CPO) MANAGEMENT SYSTEM FOR COLLECTIBLES

CROSS-REFERENCE TO RELATED APPLICATIONS

This application is a continuation-in-part of U.S. patent application Ser. No. 08/889,319, filed Jul. 8, 1997, which is a continuation-in-part of U.S. patent application Ser. No. 08/707,660, filed Sep. 4, 1996, now U.S. Pat. No. 5,794,207, each incorporated by reference herein.

FIELD OF THE INVENTION

The present invention relates generally to a system for processing the sale of goods and, more particularly, to a system for managing the sale of collectibles, such as coins, stamps and comic books, and other used or secondary market goods, to buyers who have submitted a purchase offer for the purchase of such goods.

BACKGROUND OF THE INVENTION

Most systems for processing the sale of products are seller-driven, whereby the seller prices, packages, configures and offers the product for sale, and the buyer decides whether or not to accept the seller's offer. In a buyer-driven system, on the other hand, the buyer dictates the terms of the offer and one or more sellers decide whether or not to accept. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Many large organizations, such as corporations or government entities, utilize a buyer-driven system to purchase goods or services at the lowest possible price. Initially, the purchaser formulates a detailed written specification, typically called a "Request for Proposal" (RFP), setting forth the quantities and requirements of what the purchaser is looking to buy. Once finalized, the RFPs are distributed to a list of known potential suppliers. Potential suppliers then screen the RFPs to identify those that they might be able to fulfill, and thereafter determine whether or not to invest the necessary time and effort to submit a formal, legally binding proposal to the buyer by a deadline established in the RFP. Once submitted, the proposals are evaluated by the buyer, and the chosen supplier, corresponding to the selected proposal, is notified that it has "won" the business at the price quoted.

Large organizations can take advantage of the benefits afforded by the RFP process because their volume buying represents a worthwhile opportunity for suppliers to compete for their business. In addition, large organizations have the resources to communicate their buying needs to a sufficient number of suppliers. As a result, large organizations can often achieve substantial unit cost savings, especially on commodities or commodity services (such as office supplies, insurance or long distance telephone service) and on perishable items (such as airline tickets and hotel rooms). Individual consumers, however, cannot effectively participate in the RFP process with current systems because they generally do not have the bulk buying power and resources of large organizations.

While there have been attempts to utilize the Internet to effectuate bilateral buyer-driven transactions between individual consumers and sellers, those attempts have been largely unsuccessful. For example, buyers can post "wanted" advertising at little or no cost on "bulletin board" type Internet sites, such as United Computer Exchange and Classified 2000, or submit bids for available products in an online auction, such as Interactive Auction Online. Thus, in an online classified system, consumers can essentially post their own RFP to a large number of potential sellers. In an online auction, however, buyers are unable to post their offer to a multiple of sellers.

In practice, it is impractical for potential sellers to frequent the various "bulletin board" sites and online classified systems, or respond to the individual RFPs which typically have diverse formats, conditions, terms, and language styles. In addition, sellers are deterred from using such a process because there is (i) no guarantee of the authenticity of the RFP, (ii) the cost of negotiating with individual consumers is often too high, and (iii) it is difficult to enforce any agreement (including payment guarantees'which may be reached between the consumer and the seller. Thus, a seller's item may be removed from the available inventory when a buyer desires to purchase the item, until the purchase price is submitted by the buyer. Since there is no guarantee that the buyer will complete the transaction, however, the purchase price may never be submitted and the seller's item will have to be resubmitted. In turn, the absence of a critical mass of sellers reduces the incentive for buyers to post their RFPs.

When both the buyer and the seller involved in a transaction are individuals, the above-mentioned limitations of current systems become even more apparent. In the collectibles industry, for example, the buyers and sellers of collectibles, such as coins, stamps, art prints, comic books, baseball cards, jewelry, or other used or secondary market goods, are typically individuals or their agents, such as consignment shops. Although most individuals have a home full of valuable items that they have acquired offer the years, but no longer desire, reselling such unwanted items is a time-consuming and often frustrating process. Even if a seller is able to locate a potential buyer, after expending significant time and money attracting and screening potential buyers, the buyer is typically unwilling to pay the full value for the item to an individual seller. Buyers recognize that an individual seller does not have the same overhead as an institutional seller, and attempt to utilize this knowledge to obtain cost savings. In addition, individual sellers typically do not provide a warranty, and the buyer is therefore often required to bear the risk that the goods are authentic and of reasonable quality.

In addition, since individual buyers and sellers are typically unknown to each other, and lack the reputation of an institutional buyer or seller, both parties are typically unwilling to perform until the other has done so. While the seller is typically unwilling to deliver the item until the buyer has paid in full, the buyer is likewise unwilling to pay for the item until the item has been delivered and inspected. Each party recognizes that their leverage, or source of recourse, is lost once they have performed. Although an escrow agent or other third party can be effectively utilized to reduce such post-transaction performance issues, the escrow agent does not (i) guarantee the authenticity of the buyer's offer; or (ii) reduce the cost of negotiating and consummating a transaction among individual buyers and sellers.

In fact, although the present invention permits buyers and sellers to communicate and exchange goods by means of a centralized electronic network, the role of the escrow agents or other third parties, such as collectibles dealers or consignment shops, does not disappear. Such dealers become essential in an Internet marketplace, as their expertise in authenticating goods provides a mechanism for assuring buyers and sellers that they will not be cheated by each other. In this manner, dealers become authenticators and derive profit from their expertise, without having to risk their capital in maintaining an inventory.

As apparent from the above deficiencies with conventional systems for selling goods, a need exists for a buyer-driven system that permits a buyer to obtain used goods, for example, to fill a collection, at a price set by the buyer, typically below the retail price. Yet another need exists for a system that permits sellers to dispose of unwanted items and thereby obtain value from such unwanted items. Another need exists for a system that permits passive sellers, i.e., those sellers who do not want to be a salesman, to dispose of the inventory that fills their home. A further need exists for a system that permits a dealer to eliminate his inventory and to utilize his expertise to make sales from a virtual inventory.

SUMMARY OF THE INVENTION

Generally, according to one aspect of the invention, a collectible conditional purchase offer (CPO) management system is disclosed for receiving and processing individual CPOs from buyers for one or more collectibles, such as coins, stamps, art prints, comic books, baseball cards, jewelry, or other used or secondary market goods. The collectible CPO management system processes each received CPO to determine whether one or more sellers are willing to accept a given collectible CPO. If a seller accepts a given CPO, and ultimately delivers goods complying with the buyer's CPO, the buyer is bound on behalf of the accepting seller, to form a legally binding contract. A CPO is a binding offer containing one or more conditions submitted by a buyer for the purchase of goods, at a buyer-defined price. The CPO may be guaranteed, for example, by a general-purpose account, such as a credit or debit account.

According to one aspect of the invention, once a CPO is accepted by a seller, but before completing the transaction, the goods are preferably forwarded to a dealer/authenticator for evaluation. The dealer/authenticator can be part of the collectible CPO management system or another third party having knowledge of the subject goods. The dealer/authenticator preferably validates, authenticates and optionally guarantees the goods, while also serving as the distribution point for the collectibles sold by the collectible CPO management system. As used herein, validation establishes that the item actually exists. Authentication proves that the item is in the condition stated by the accepting seller. The, guarantee, if desired, insures that the buyer has not purchased a counterfeit item or an item of unacceptable quality. Thus, once an item is delivered to the dealer/authenticator and approved, the dealer/authenticator can deliver the item to the buyer and authorize payment to the accepting seller.

The collectible CPO management system preferably allows a number of sellers to conditionally accept each CPO. In this manner, the collectible CPO management system can ensure that at least one of the accepting sellers will have the collectible item in the condition specified by the buyer. Preferably, each of the accepting seller(s) are prioritized into a hierarchy based on predetermined criteria. Thus, the dealer/authenticator will evaluate the items received from each seller in the hierarchy, in the appropriate order, until goods in the condition specified by the buyer are identified. For example, sellers may be assigned a priority in the hierarchy based on the order in which their acceptances are received by the collectible CPO management system. In addition, the priority may be based on the performance of each accepting seller for previous transactions. Alternatively, priority may be determined based on the geographical proximity of each accepting seller to the buyer.

A seller inventory building process preferably receives a list of items, or categories of items, to be sold from a seller, and creates a record of each item or category in an item database. A collectible CPO evaluation process preferably receives a collectible CPO from a buyer; provides the CPO to potential sellers and determines whether any seller is willing to accept the CPO. An authentication monitoring; process preferably monitors the authentication performed by the dealer/authenticator and determines whether the dealer/authenticator validates the item provided by an accepting seller. An unfilled CPO periodic maintenance process is preferably periodically executed to determine whether the goods associated with a previously unfilled CPO have been added to the inventory of the collectible CPO management system.

Buyers and sellers are often looking to buy or sell, as appropriate, an entire collection. Thus, the collectible CPO management system permits a CPO submitted by a buyer for an entire collection to be deconstructed or broken up into component CPOs which are individually offered to sellers. In addition, if a seller only wishes to sell an entire collection as part of a single transaction, it may be necessary to combine a plurality of individual CPOs for portions of the collection in order to meet the seller's requirements. The individual CPOs are processed by the collectible CPO management system and pre-bound, until the entire collection has been sold.

A more complete understanding of the present invention, as well as further features and advantages of the present invention, will be obtained by reference to the following detailed description and drawings.

BRIEF DESCRIPTION OF THE DRAWINGS

FIG. 3 illustrates a sample table from the buyer database of FIG. 2;

FIG. 4 illustrates a sample table from the seller database of FIG. 2;

FIG. 6 illustrates a sample table from the item class database of FIG. 2;

FIG. 7 illustrates a sample table from the offer database of FIG. 2;

FIG. 8 illustrates a sample table from the item database of FIG. 2;

DETAILED DESCRIPTION

Figure 1:
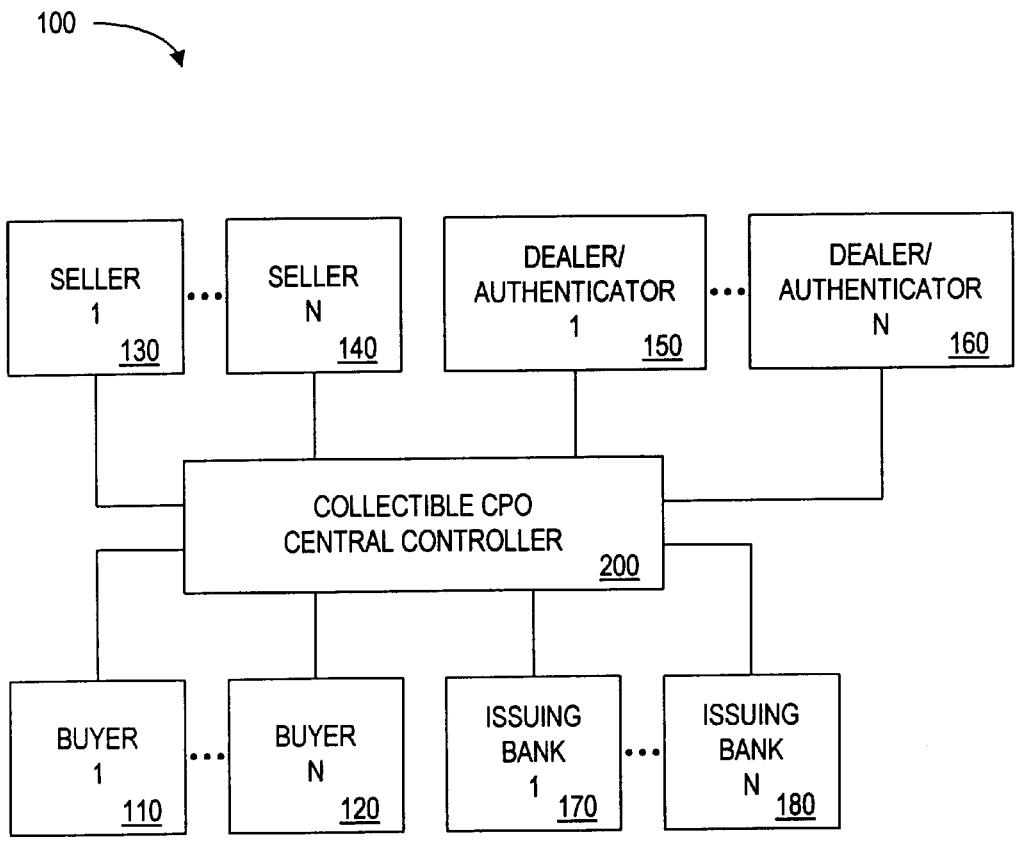
FIG. 1 is a schematic block diagram illustrating a collectible conditional purchase offer (CPO) management system in accordance with the present invention.

FIG. 1 shows a collectible conditional purchase offer (CPO) management system 100 for receiving and processing CPOs from one or more buyers, such as buyers 110 and 120, for one or more collectibles, such as coins, stamps, art prints, comic books, baseball cards, jewelry, or other used or secondary market goods. The collectible CPO management system 100 processes each received CPO to determine whether one or more sellers, such as sellers 130 and 140, are willing to accept a given collectible CPO. As discussed further below, if a seller accepts a given CPO, and ultimately delivers goods complying with the buyer's CPO, the collectible CPO management system 100 binds the buyer 110 on behalf of the accepting seller 130, to form a legally binding contract.

According to a feature of the present invention, once a CPO is accepted, but prior to completing the transaction, the goods are preferably forwarded to a dealer/authenticator, such as dealer/authenticator 150 or 160, for evaluation. The dealer/authenticator 150 can be part of the collectible CPO management system 100 or another third party having knowledge of the subject goods. The dealer/authenticator 150 preferably validates, authenticates and optionally guarantees the goods, while also serving as the distribution point for the collectibles sold by the collectible CPO management system 100. As used herein, validation establishes that the item actually exists. Authentication proves that the item is in the condition stated by the seller. The guarantee, if desired, insures that the buyer has not purchased a fake or counterfeit item. Thus, once an item is delivered to the dealer/authenticator 150 and approved, the dealer/authenticator 150 can deliver the item to the buyer and authorize payment to the accepting seller.

According to a further feature of the invention, the collectible CPO management system 100 preferably allows a number of sellers to conditionally accept each CPO. In this manner, the collectible CPO management system 100 can ensure that at least one of the accepting sellers will have the collectible item in the condition specified by the buyer. Generally, the grade and condition of used goods is determined primarily by educated opinion, for example, by a person having knowledge of the subject goods. Preferably, each of the accepting seller(s) are prioritized into a hierarchy based on predetermined criteria. For example, sellers may be assigned a priority in the hierarchy based on the order in which their acceptances are received by the collectible CPO management system 100. Alternatively, priority may be determined based on the geographical proximity of each accepting seller to the buyer. In addition, the priority may be based on the performance of each accepting seller for previous transactions.

As used herein, a CPO is a binding offer containing one or more conditions submitted by a buyer for the purchase of goods, such as coins, stamps, art prints, comic books, baseball cards, jewelry, or other used or secondary market goods, at a buyer-defined price. The CPO may be guaranteed, for example, using a general-purpose account, such as a credit or debit account, maintained by an issuing bank, such as issuing bank 170 and 180. The conditions specified in a CPO may include, for example, a description of the goods and a minimum required quality or condition.

As shown in FIG. 1, the collectible CPO management system 100 preferably includes a central controller 200, discussed further below in conjunction with FIG. 2. The collectible CPO management system 100 may provide a given CPO to selected sellers based on the industry associated with the CPO, or the types of goods in the seller's collection, or other predefined screening criteria, so that sellers only obtain CPOs that they may be interested in or are authorized to screen. For example, a seller, such as seller 130, may specify that the seller only wishes to review CPOs that potentially dispose of a minimum predefined percentage of the seller's collection. Alternatively, the collectible CPO management system may provide all CPOs to all sellers for screening.

As discussed further below, each buyer and seller contacts the collectible CPO management system 100, for example, by means of telephone, facsimile, online access, e-mail, in-person contact or through an agent, and provides the collectible CPO management system 100 with the terms of their CPO, or the list of available items the seller desires to sell, as appropriate. It is noted that each buyer and seller may employ a general-purpose computer, for communicating with the collectible CPO management system 100. The general-purpose computer of each buyer and seller is preferably comprised of a processing unit, a modem, memory means and any software required to communicate with the collectible CPO management system 100.

As discussed below in conjunction with FIG. 9, individual sellers preferably contact the collectible CPO management system 100 to provide a list of the inventory available for sale from the seller's collection. In addition, as discussed below in conjunction with FIG. 10, buyers preferably contact the collectible CPO management system 100 to evaluate the available inventory and, if desired, submit a CPO for one or more collectibles, or other used or secondary market goods. In one embodiment, the available inventory can be made available for buyers to evaluate, without revealing any information identifying the seller. In an alternate embodiment, buyers can submit CPOs directly, without first evaluating available inventory.

The collectible CPO management system 100, as well as any general-purpose computers utilized by buyers 110, 120, sellers 130, 140, dealer/authenticators 150, 160 and issuing banks 170, 180 (collectively, the "nodes") preferably transmit digitally encoded data and other information between one another. The communication links between the nodes preferably comprise a cable, fiber or wireless link on which electronic signals can propagate. For example, each node may be connected via an Internet connection using a public switched telephone network (PSTN), such as those provided by a local or regional telephone operating company. Alternatively, each node may be connected by dedicated data lines, cellular, Personal Communication Systems ("PCS"), microwave, or satellite networks.

In one embodiment, the central controller 200 initially reserves a portion of the CPO price offered by the buyer. Thus, the CPO is initially offered at a price lower than the full CPO price to sellers, and the offer price is incrementally increased until a seller agrees to bind for a price. The collectible CPO management system 100 gradually diminishes its profit margin, until a seller accepts the CPO. To prevent the Collectible CPO management system 100 from submitting bids to ascertain a seller's price floor, a third party agent can ensure that the collectible CPO management system 100 has a legitimate buyer before starting the "seller race." In another variation, the buyer can post a high and a low offer price, as well as an optional fixed increment amount with a CPO. The collectible CPO management system 100 initially posts the buyer's CPO with the specified low price. Sellers can accept, or wait until the price increases incrementally. By not binding early, sellers risk having another seller accept the CPO and having a higher place in the seller hierarchy for authentication.

Figure 2:
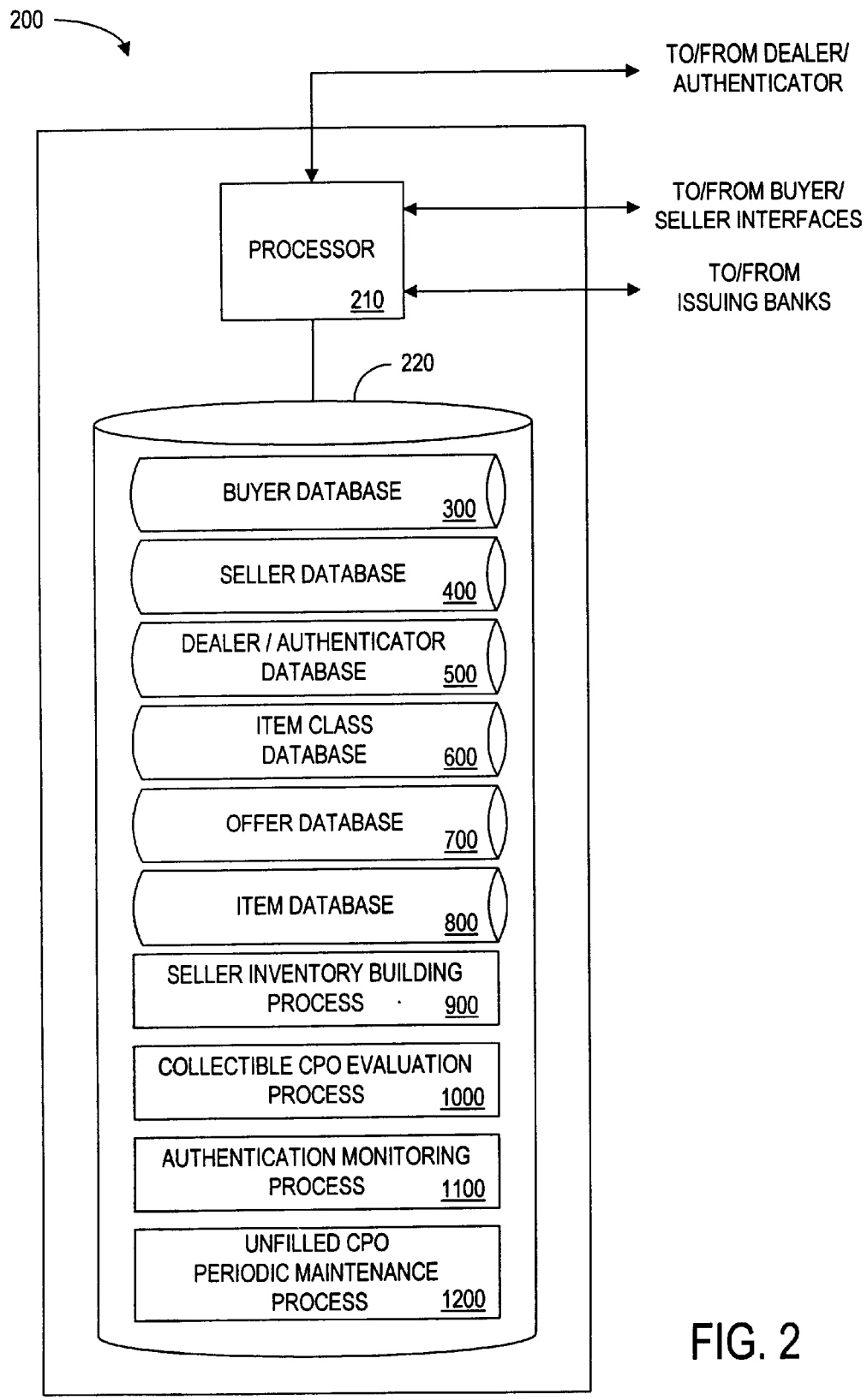
FIG. 2 is a schematic block diagram of the exemplary central controller of FIG. 1.

The central controller 200, shown in FIG. 2, preferably includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute. The processor 210 preferably includes a control unit, an arithmetic logic unit (ALU), and a local memory storage device, such as, for example, an instruction cache or a plurality of registers, in a known manner. The control unit is operable to retrieve instructions from the data storage device 220 or ROM. The ALU is operable to perform a plurality of operations needed to carry out instructions. The local memory storage device is operable to provide high-speed storage used for storing temporary results and control information.

As discussed further below in conjunction with FIGS. 3 through 8, respectively, the data storage device 220 includes a buyer database 300, a seller database 400, a dealer/authenticator database 500, an item class database 600, an offer database 700 and an item database 800. The buyer database 300 preferably stores information on each buyer of the collectible CPO management system 100, including biographical information and billing information, such as a credit card number. The seller database 400 preferably stores information on each seller which is registered with the collectible CPO management system 100 to sell collectibles or other used goods to CPO buyers. The dealer/authenticator database 500 preferably stores information on each dealer/authenticator 150 who is registered with the collectible CPO management system 100 to authenticate certain types of goods in connection with an accepted CPO. The item class database 600 records an item class identifier and descriptor for each class of goods sold by the collectible CPO management system 100. The offer database 700 preferably contains a record of each CPO being processed by the collectible CPO management system 100, including the conditions of each CPO and the associated status. The item database 800 preferably maintains the inventory of goods available for sale by the collectible CPO management system 100, including an identifier of the seller of the goods, as well as an optional indication of the grade and minimum offer price (the minimum offer price need not be displayed to buyers).

In addition, as discussed further below in conjunction with FIGS. 9 through 12, respectively, the data storage device 220 includes a seller inventory building process 900, a collectible CPO evaluation process 1000, an authentication monitoring process 1100 and an unfilled CPO periodic maintenance process 1200. Generally, the seller inventory building process 900 receives a list of items to be sold from a seller, and creates a record of each item in the item database 800. The collectible CPO evaluation process 1000 receives a collectible CPO from a buyer; provides the CPO to potential sellers and determines whether any seller is willing to accept the CPO. The authentication monitoring process 1100 monitors the authentication performed by the dealer/authenticator 150 and determines whether the dealer/authenticator 150 validates the item provided by an accepting seller. The unfilled CPO periodic maintenance process 1200 is preferably periodically executed to determine whether the goods associated with a previously unfilled CPO have been added to the inventory of the collectible CPO management system 100.

A network interface (not shown) preferably connects the central controller 200 to the buyer, sellers, dealer/authenticator and issuing banks, for example, by means of an Internet connection using the public switched telephone network (PSTN). The network interface preferably includes multiple communication channels for simultaneously establishing a plurality of connections.

FIG. 3 illustrates an exemplary buyer database 300 that preferably stores information on each buyer of the collectible CPO management system 100, including biographical information and billing information, such is a credit card number. The buyer database 300 maintains a plurality of records, such as records 305–315, each associated with a different buyer. For each buyer identifier in field 330, the buyer database 300 includes the corresponding buyer name, address and electronic mail address in fields 335 through 345, respectively, and credit card number or other general-purpose account identifier in field 350. The buyer identifier stored in field 330 may be utilized, for example, to index the offer database 700 to obtain previous purchases and CPOs associated with the buyer.

FIG. 4 illustrates an exemplary seller database 400 which preferably stores information on each seller which is registered with the collectible CPO management system 100 to sell collectibles or other used goods to CPO buyers. The seller database 400 maintains a plurality of records, such as records 405–415, each associated with a different seller. For each seller identifier listed in field 430, the seller database 400 includes the corresponding seller name, address, contact information and credit card number in fields 435 through 450, respectively. It is noted that the seller identifier stored in field 430 may be utilized, for example, to index the offer database 700 to obtain CPOs which have been accepted by the seller. The credit card number stored in field 450 can be used primarily to credit sellers' accounts for completed transactions or to assess a fine to a seller who delivers an item that does not meet the quality grade stated by the seller.

Figure 5:
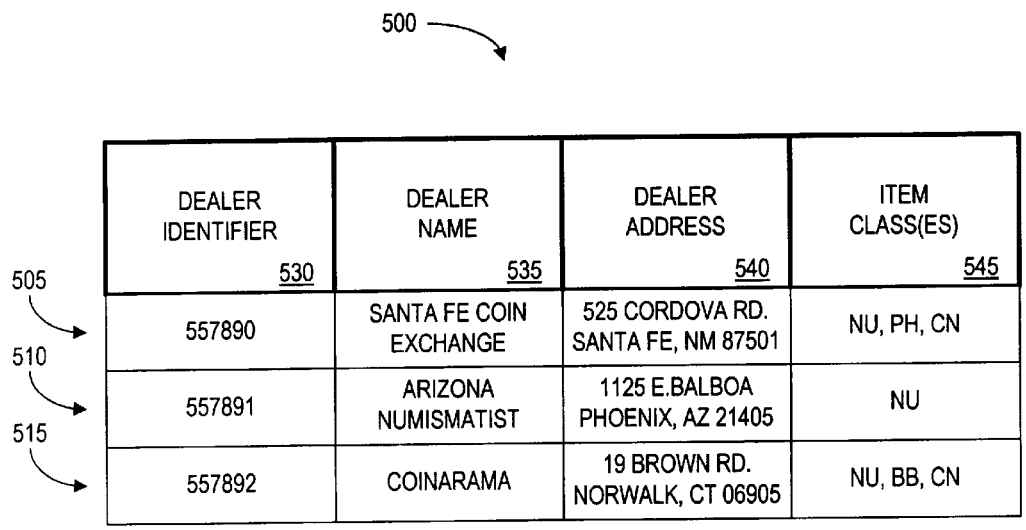
FIG. 5 illustrates a sample table from the sealer/authenticator database of FIG. 2.

FIG. 5 illustrates an exemplary dealer/authenticator database 500 which preferably stores information on each dealer/authenticator 150 who is registered with the collectible CPO management system 100 to authenticate goods in connection with an accepted CPO. The dealer/authenticator database 500 maintains a plurality of records, such as records 505–515, each associated with a different dealer/authenticator 150. For each dealer identifier listed in field 530, the dealer/authenticator database 500 includes the corresponding dealer name and address in fields 535 and 540, respectively. In addition, field 545 preferably records the item class(es) for which the dealer is properly qualified to authenticate items.

FIG. 6 illustrates an exemplary item class database 600 that records an item class identifier and descriptor for each class of goods sold by the collectible CPO management system 100. The item class database 600 maintains a plurality of records, such as records 605–625, each associated with a different item class. For each item class identifier listed in field 640, the item class database 600 includes the corresponding item class descriptor in field 650.

FIG. 7 illustrates an exemplary offer database 700 which preferably contains a record of each CPO being processed by the collectible CFO management system 100, including the conditions of each CPO and the associated status. The offer database 700 maintains a plurality of records, such as records 705–720, each associated with a different CPO. For each CPO listed in field 722, the CPO database 700 includes an identifier of the buyer who submitted the CPO, as well as any sellers who have accepted the CPO in fields 724 through 728. The date the CPO was posted, and the date the CPO is filled are recorded in fields 730 and 732. The current status of the CPO, and the corresponding offer amount are recorded in fields 734 and 736, respectively. If a seller submits a counteroffer to the CPO, the amount of the counteroffer is recorded in field 738. The item class identifier, a description of the goods associated with the CPO and the required minimum quality condition are recorded in fields 742 through 746. The date of authentication and the corresponding dealer/authenticator 150 are set forth in columns 748 and 750. The item numbers of the items which were sent to the dealer/authenticator 150 before an acceptable item was finally authenticated by the dealer/authenticator 150 are recorded in fields 752 through 754. Finally, the item number of the item number which was actually sold to the buyer, and an identifier of the corresponding seller are recorded in fields 756 and 758.

FIG. 8 illustrates an exemplary item database 800 which preferably maintains the inventory of goods available for sale by the collectible CPO management system 100, including an identifier of the seller of the goods, as well as an indication of the grade and minimum offer price. The item database 800 maintains a plurality of records, such as records 805 through 815, each associated with a different item for sale. For each item identified in field 820, the item database 800 includes an identifier of the seller of the item, as well as the item class and posting date in fields 825 through 835, respectively. Finally, a descriptor for each item, as well as a corresponding quality grade and minimum offer price are preferably set forth in fields 840 through 850, respectively.

Figure 9:
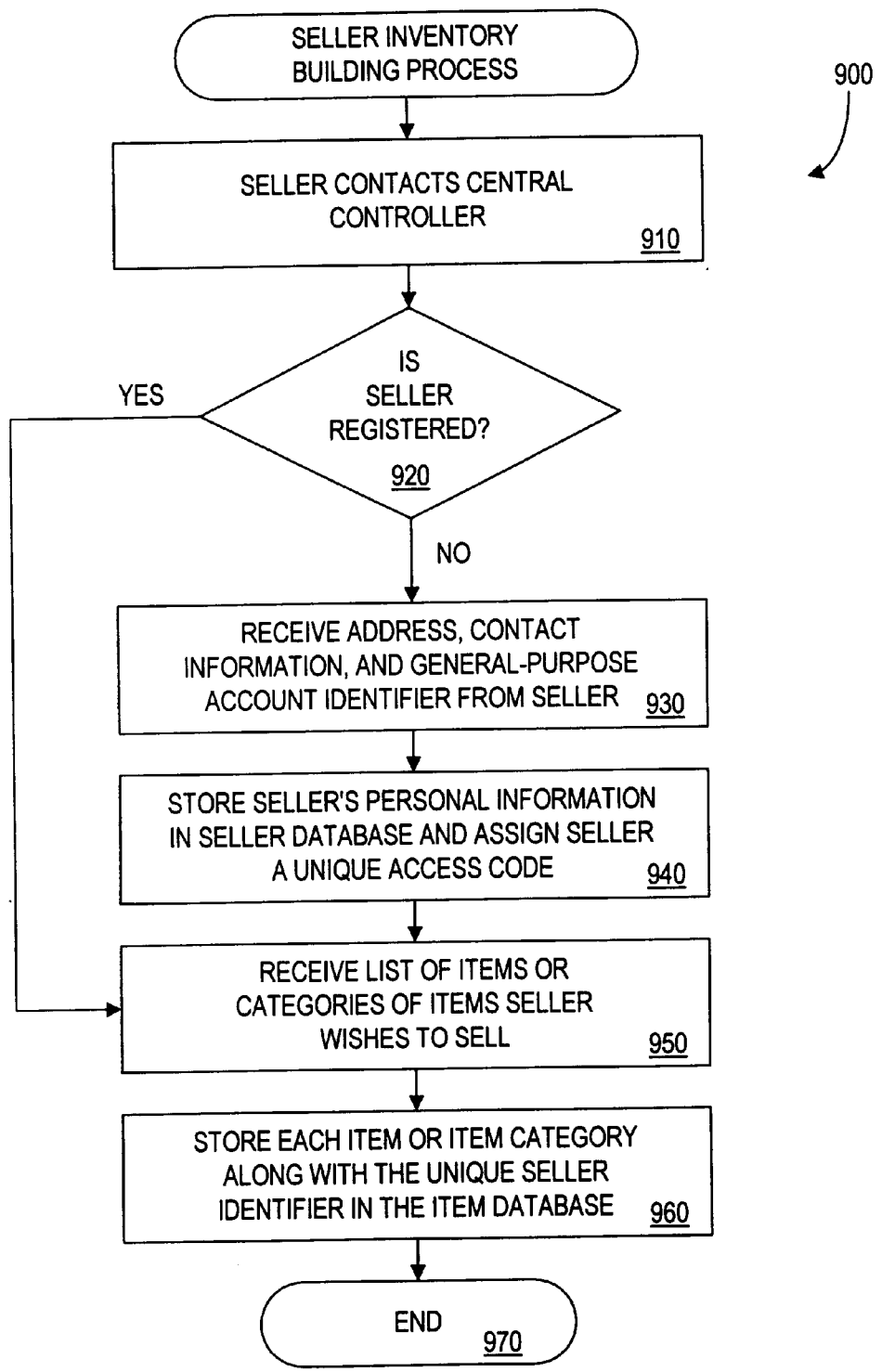
FIG. 9 is a flowchart describing an exemplary seller inventory building process implemented by the central controller of FIG. 2.

As discussed above, the central controller 200 preferably executes a seller inventory building process 900, shown in FIG. 9, to receive a list of items to be sold from a seller, and create a record of each item in the item database 800. As illustrated in FIG. 9, the seller inventory building process 900 is initiated during step 910 upon an attempt by a seller to contact the collectible CPO management system 100. A test is initially performed during step 920 to determine if the seller is registered with the collectible CPO management system 100 to sell goods. If it is determined during step 920 that the seller is registered to sell goods, then program control proceeds directly to step 950.

If, however, it is determined during step 920 that the seller is not registered to sell goods, then the seller is registered during steps 930 and 940. The seller's address, telephone number and item class are preferably received from the seller during step 930. Thereafter, the received seller information is stored in the seller database 400 during step 940, and a unique access code is assigned to the seller.

A list of items, or general categories of items, that the seller wishes to sell is preferably received during step 950. Each identified item or category of item is then stored in the item database 800 along with the unique seller identifier during step 960. Program control terminates during step 970.

Figure 10A:
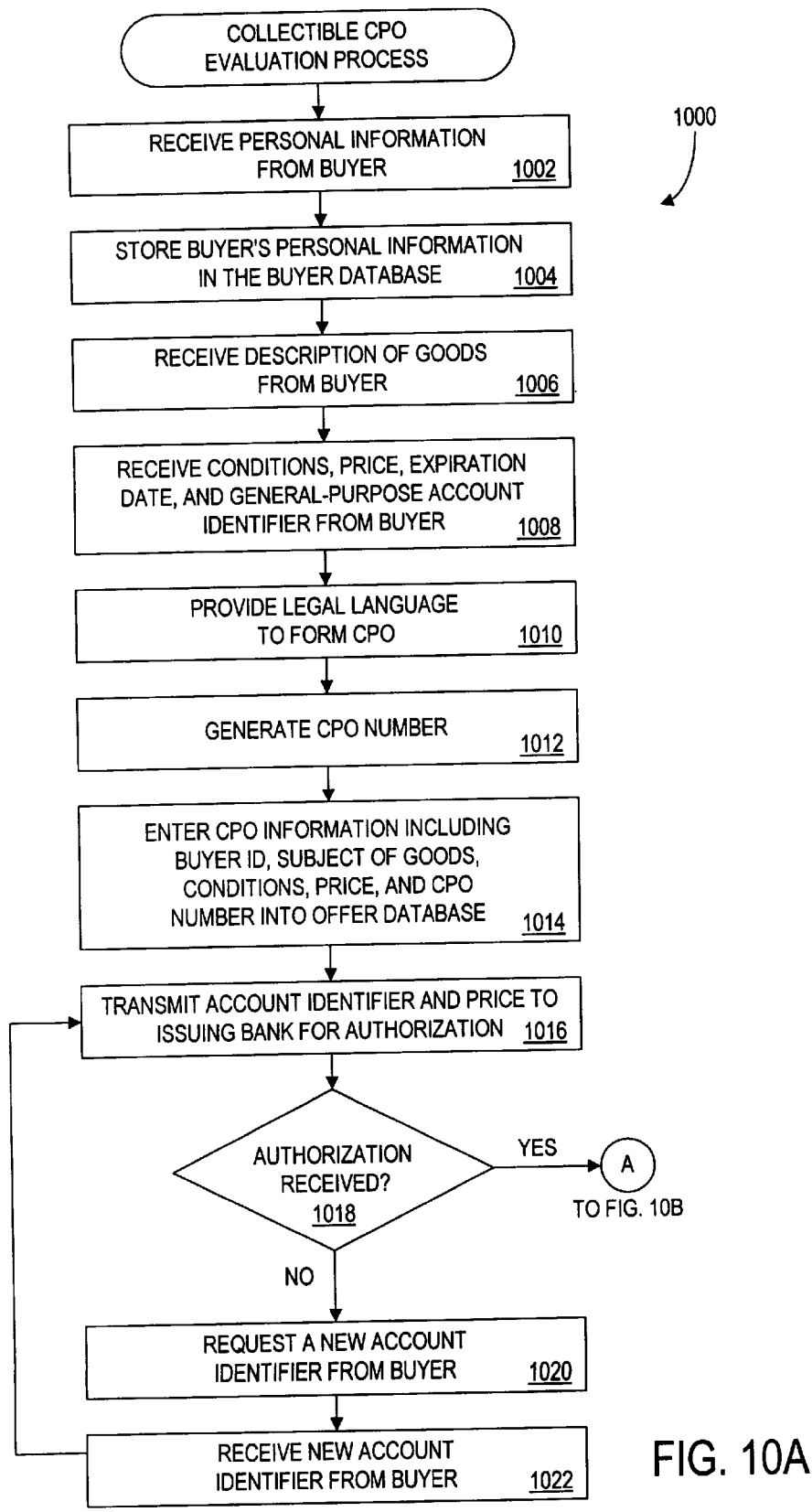
FIGS. 10a through 10d, collectively, are a flowchart describing an exemplary collectible CPO evaluation process implemented by the central controller of FIG. 2.

As previously indicated, the central controller 200 preferably executes a collectible CPO evaluation process 1000, shown in FIGS. 10*a* through 10*d*, to receive a collectible CPO from a buyer; provide the CPO to potential sellers and determine whether any seller is willing to accept the CPO. As shown in FIG. 10*a*, the collectible CPO evaluation process 1000 initially receives personal information from the buyer, such as name, address and email address, during step 1002 and thereafter stores the received personal information in the buyer database 300 during step 1004. Thereafter, the central controller 200 will receive a description of the desired good(s) from the buyer, as well is the conditions, price and expiration date associated with the CPO from the buyer, as well as an identifier of a general purpose account from which funds may be paid, such as a credit or debit card account, during step 1008. It is noted that if the buyer ultimately fails to purchase the requested item once the CPO is accepted by a seller, the buyer can be charged a fee or a penalty. In this manner, the offer is guaranteed with a general purpose account, for example, using a line of credit on a credit card account.

Appropriate legal language is preferably displayed or read to the buyer during step 1010 to form a binding CPO. A CPO number is generated during step 1012, and the CPO information, including a buyer identifier, subject of goods, conditions, CPO price and CPO number, and are then entered into the offer database 700 during step 1014. Once the terms of the CPO have been received and recorded by the collected CPO management system 100, the buyer's credit card number are transmitted to the appropriate issuing bank 170, 180 during step 1016, together with the CPO price, for authorization. It is noted that the authorization performed during steps 1016 through 1022 could be performed after the determination is made during step 1026 that the desired item is available, as discussed below.

Figure 10B:
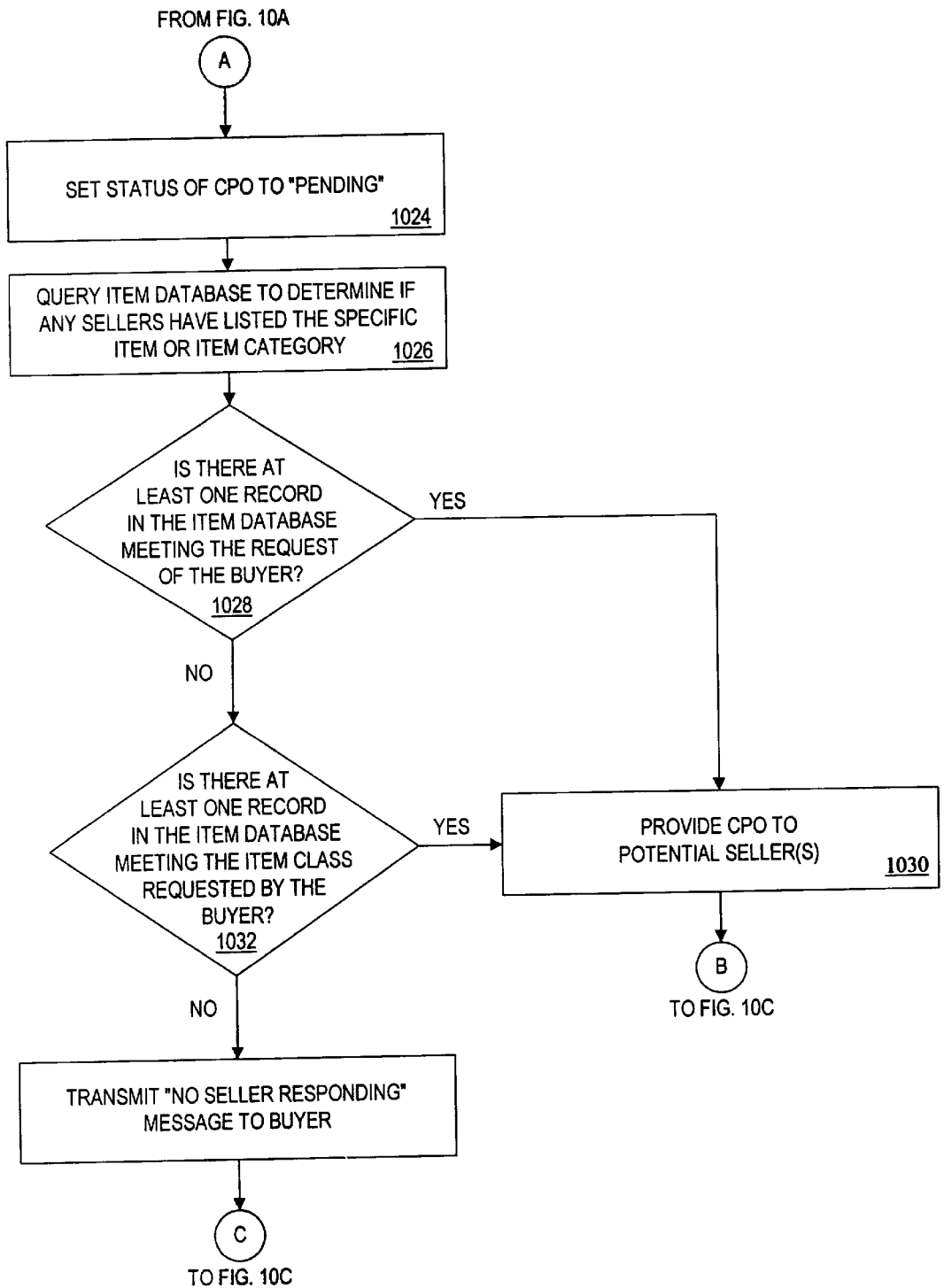
Figure 10C:
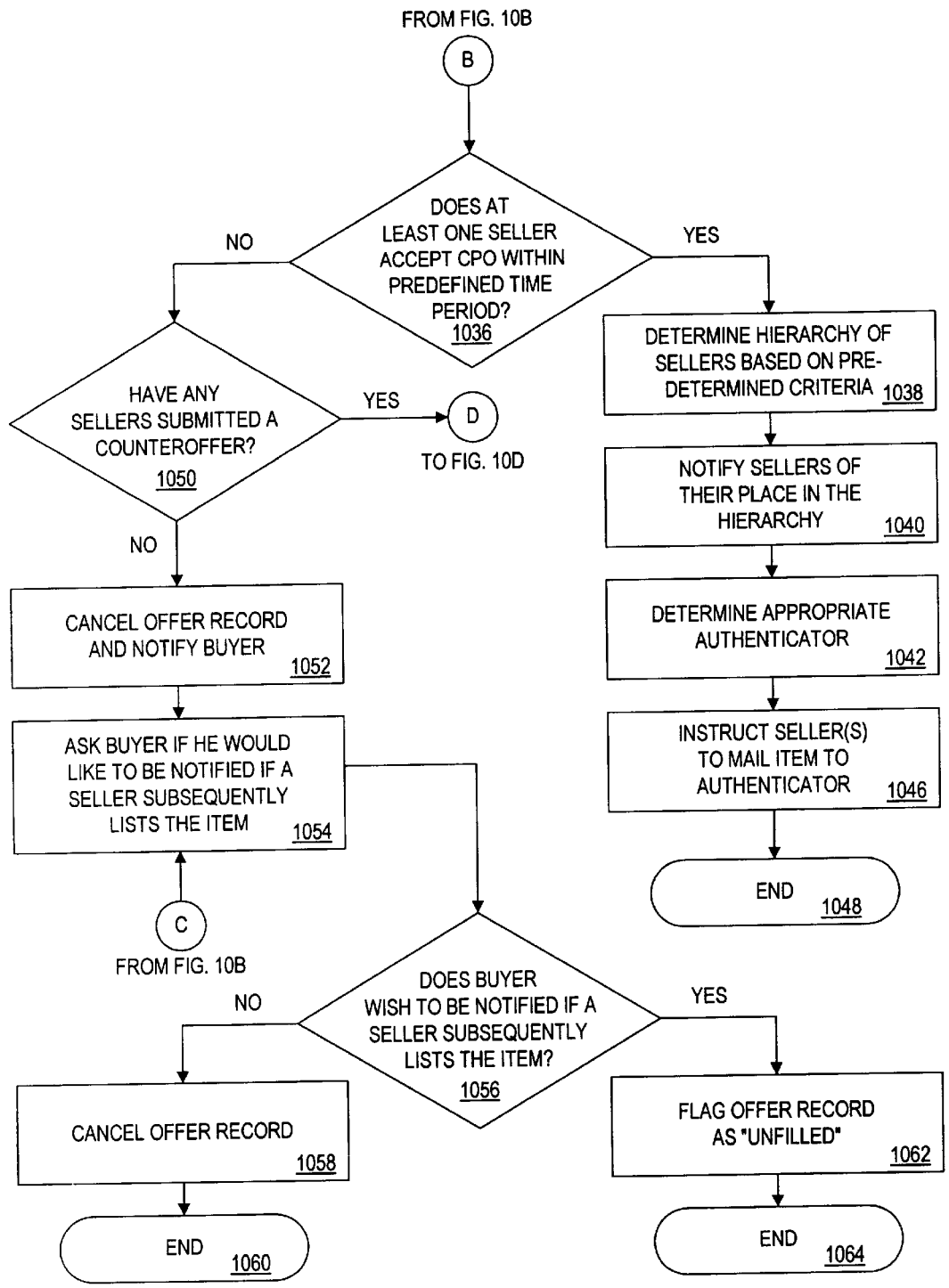
Figure 10D:
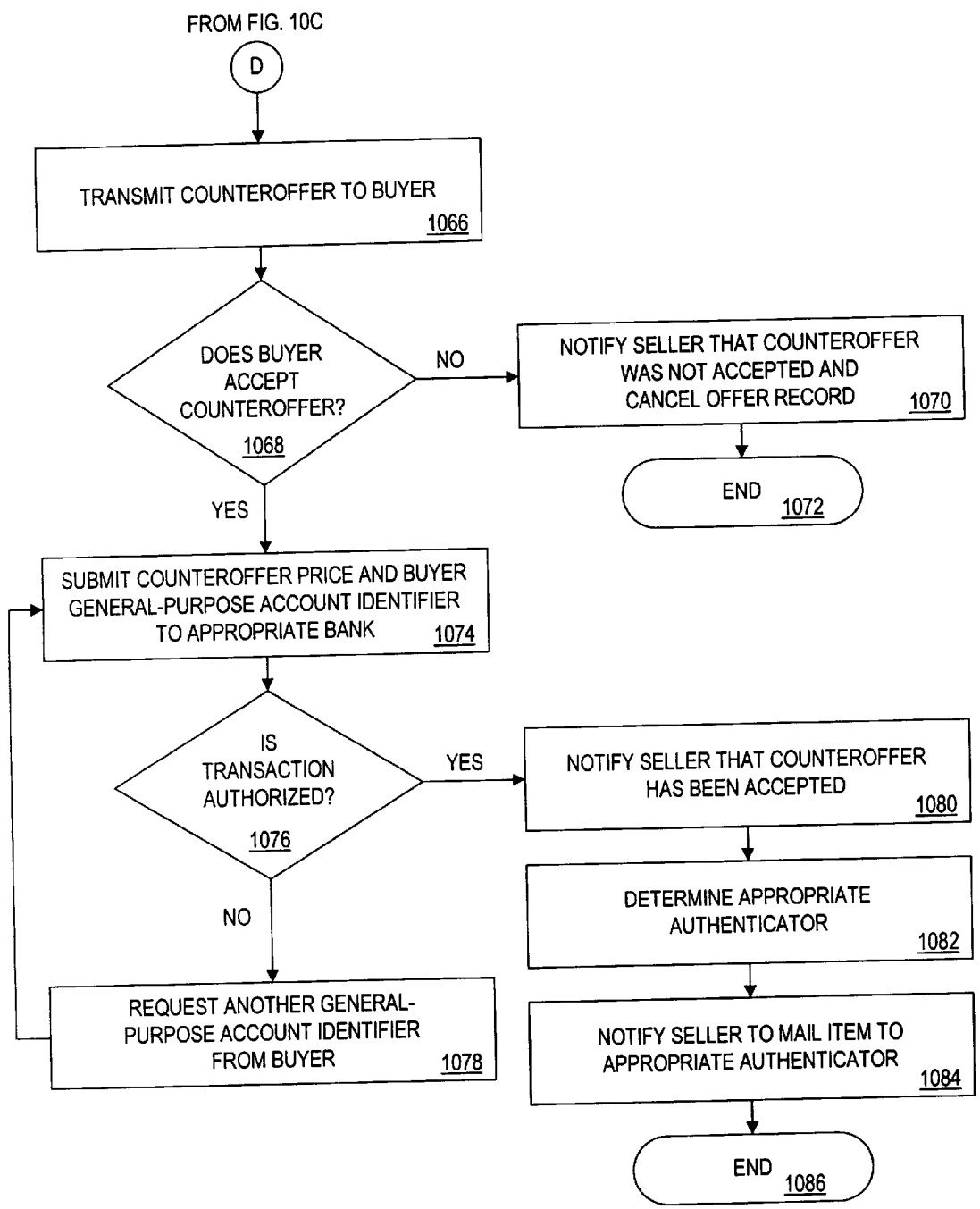

A test is initially performed during step 1018 to determine if the transaction was authorized by the issuing bank 170. If it is determined during step 1018 that the transaction was not authorized by the issuing bank 170, then a new credit card number is requested from the buyer during step 1020, and received during step 1022. Program control then returns to step 1016 to again attempt the authorization process in the manner described above. If, however, it is determined during step 1018 that the transaction was authorized by the issuing bank 170, then the status of the CPO is set to pending during step 1024 (FIG. 10*b*).

The item database 800 is then queried during step 1026 to determine if any sellers have listed the specific item or item category requested. A test is then performed during step 1028 to determine if there is at least one record in the item database 800 meeting the request of the buyer. If it is determined during step 1028 that there is not at least one record in the item database 800 meeting the request of the buyer, then a further test is performed during step 1032 to determine if there is at least one record in the item database 800 meeting the item class of the item requested by the buyer. If it is determined during step 1032 that there is not at least one record in the item database 800 meeting the item class of the item requested by the buyer, then a "no seller responding" message is preferably transmitted to the buyer during step 1034. Thereafter, program control proceeds to step 1054 (FIG. 10*c*), discussed below.

If it is determined during step 1028 that there is at least one record in the item database 800 meeting the request of the buyer, or if it is determined during step 1032 that there is at least one record in the item database 800 meeting the item class of the item requested by the buyer, then the CPO is provided to the potential seller(s) of the requested item during step 1030. As discussed further below, the CPO is preferably provided to each broadcast-based seller, for example, by means of a broadcast transmission, or by means of posting the CPO, for example, on an electronic bulletin board accessible by each broadcast-based seller, and a CPO rule evaluation process is executed for each agency-based seller. As indicated above, the CPOs provided to individual sellers may be filtered or screened in accordance with predefined criteria. For example, the collectible CPO management system 100 may provide a given CPO to selected sellers based on the item requested by the CPO or other predefined screening criteria, so that sellers only obtain CPOs that they may be interested in or are authorized to screen. In addition, a seller may specify that the seller only wishes to receive CPOs that dispose of a predefined minimum percentage of the seller's inventory of a particular collection.

Once the CPO has been provided to the potential seller(s), then a test is performed during step 1036 (FIG. 10*c*) to determine if at least one seller accepts the CPO within a predetermined time period. If it is determined during step 1036 that at least one seller has accepted the CPO within a predetermined time period, then the accepting seller(s) are prioritized into a hierarchy during step 1038 based on predetermined criteria. For example, the hierarchy may be limited to the first accepting seller, or sellers may be assigned a priority in the hierarchy based on the order in which their acceptances are received by the collectible CPO management system 100. Alternatively, priority may be determined based on the geographical proximity of each accepting seller to the buyer. In addition, the priority may be based on the performance of each accepting seller for previous transactions. In further variations, the highest priority in the hierarchy may be awarded to the seller binding at the lowest price, or to sellers who have negotiated preferences with the collectible CPO management system 100.

Thereafter, the seller(s) are notified of their place in the selling hierarchy during step 1040. An appropriate dealer/authenticator 150 for the requested item is determined during step 1042, for example, based on the expertise of the dealer/authenticator 150 and the geographical location of the buyer. The accepting seller(s) are then instructed to mail the item to the dealer/authenticator 150 during step 1046, before program control terminates during step 1048. As discussed below in conjunction with FIG. 11, the collectible CPO management system 100 preferably executes an authentication monitoring process 1100 to monitor the authentication performed by the dealer/authenticator 150 and determine whether the dealer/authenticator 150 validates the item provided by an accepting seller.

Figure 12:
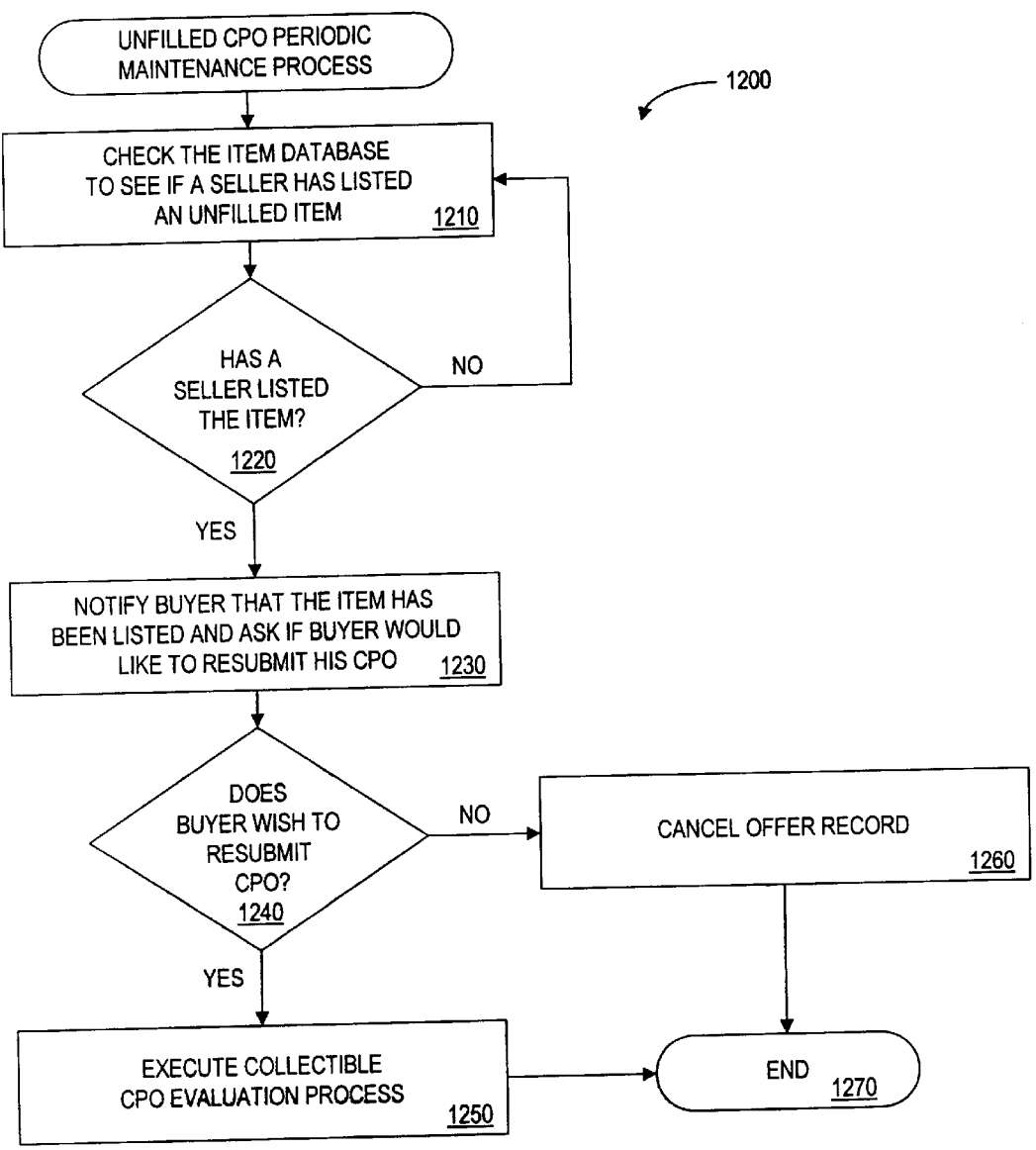
FIG. 12 is a flowchart describing an exemplary unfilled CPO periodic maintenance process implemented by the central controller of FIG. 2.

If, however, it was determined during step, 1036 that no seller has accepted the CPO within a predetermined time period, then a further test is performed during step 1050 to determine if any sellers have submitted a counteroffer. If it is determined during step 1050 that no seller submitted a counteroffer, then the offer record is cancelled in the offer database 700 during step 1052, and the buyer is notified that the CPO could not be filled. The buyer is then preferably asked during step 1054 if he would like to be notified if a seller subsequently lists the requested item for sale. A test is then performed during step 1056 to determine if the buyer wishes to be notified if a seller subsequently lists the requested item. If it is determined during step 1056 that the buyer does not wish to be notified if a seller subsequently lists the requested item, then the offer record is cancelled in the offer database 700 and program control terminates during step 1060. If, however, it is determined during step 1056 that the buyer wishes to be notified if a seller subsequently lists the requested item, then the offer record in the offer database 700 is flagged as "unfilled" during step 1062, before program control terminates during step 1064. As discussed below, an unfilled CPO periodic maintenance process 1200, shown in FIG. 12, is preferably periodically executed to determine whether the goods associated with a previously unfilled CPO have been added to the inventory of the collectible CPO management system 100.

If, however, it was determined during step 1050 that at least one seller submitted a counteroffer, then program control proceeds to step 1066 (FIG. 10*d*) where the counteroffer is transmitted to the buyer. A test is then performed during step 1068 to determine if the buyer accepted the counteroffer. If it is determined during step 1068 that the buyer does not accept the counteroffer, then the seller is notified that the counteroffer was not accepted during step 1070 and the offer record is cancelled in the offer database 700, before program control terminates during step 1072.

If, however, it is determined during step 1068 that the buyer does accept the counteroffer, then the counteroffer price and buyer credit card number are submitted to the appropriate issuing bank 170 during step 1074 for payment authorization. A test is then performed during step 1076 to determine if the transaction was authorized. If it is determined during step 1076 that the transaction was not authorized, then another credit card number is requested from the buyer during step 1078 and program control returns to step 1074 for further authorization processing. If, however, it is determined during step 1076 that the transaction was authorized, then the seller is notified during step 1080 that the counteroffer has been accepted. An appropriate dealer/authenticator 150 for the requested item is determined during step 1082, for example, based on the expertise if the dealer/authenticator 150 and the geographical location of the buyer. The seller is then instructed to mail the item to the selected dealer/authenticator 150 during step 1084, before program control terminates during step 1086.

Figure 11:
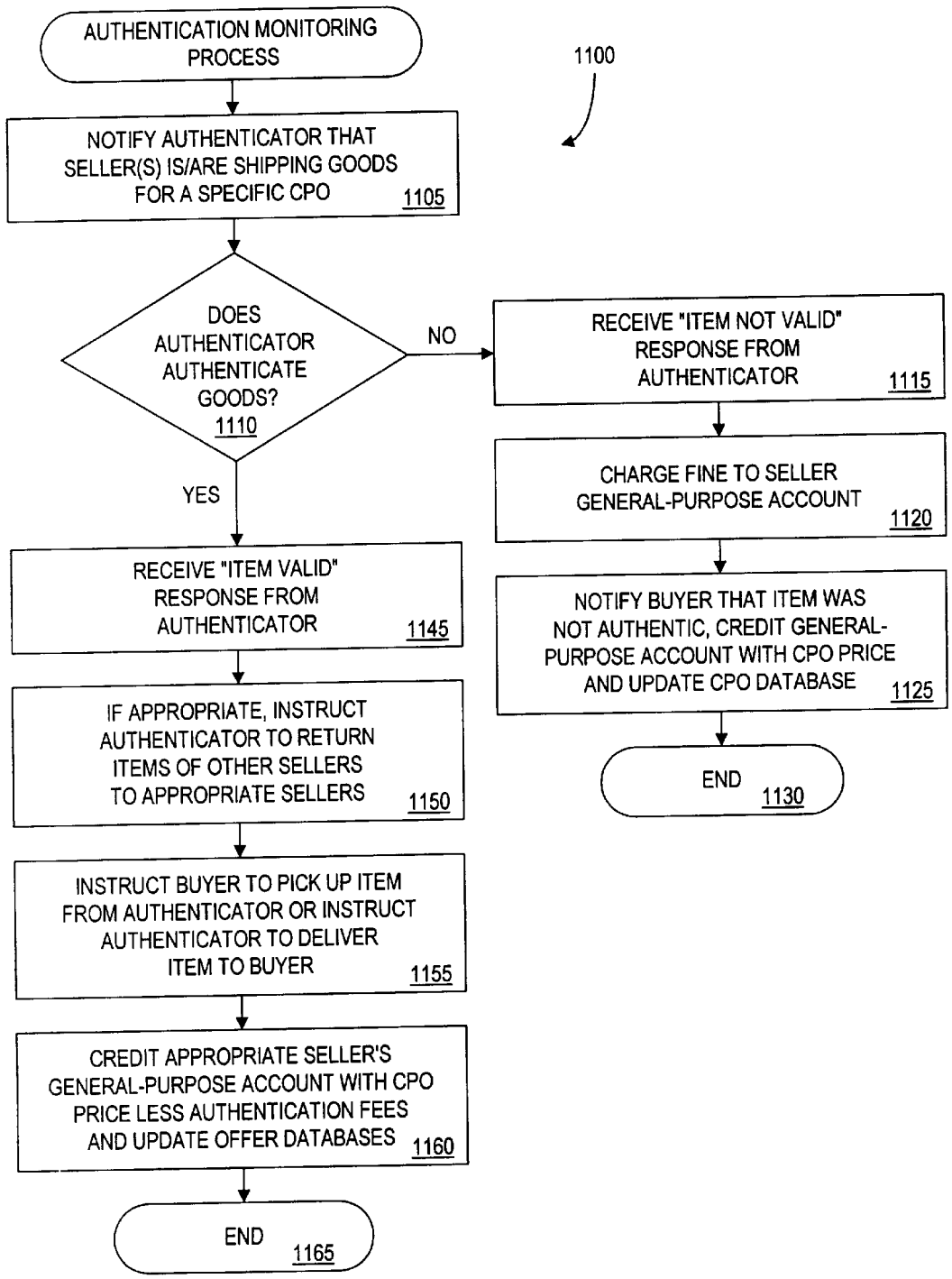
FIG. 11 is a flowchart describing an exemplary authentication monitoring process implemented by the central controller of FIG. 2.

As previously indicated, the central controller 200 preferably executes an authentication monitoring process 1100, shown in FIG. 11, on a periodic basis to monitor the authentication performed by the dealer/authenticator 150 and determine whether the dealer/authenticator 150 validates the item provided by an accepting seller. The authentication monitoring process 1100 intially notifies the authenticator 150 during step 1105 that one or more accepting seller(s) in a hierarchy are shipping goods for a specific CPO. Thereafter, a test is performed during step 1110 to determine if the dealer/authenticator 150 has validated the item. If it is determined during step 1110 that the dealer/authenticator 150 has not validated the item, then an "item not valid" response is received from the dealer/authenticator 150 during step 1115. A fine can then be charged to the seller's credit card during step 1120. The buyer is notified that the item was not authentic, the buyer's credit card account is credited with the CPO price and the offer database is updated during step 1125, before program control terminates during step 1130. In an alternate embodiment (not shown), the dealer/authenticator 150 or the collectible CPO management system 100 can attempt to complete a transaction between the buyer and seller for the sub-grade goods, at a reduced price.

If it is determined during step 1110 that the dealer/authenticator 150 has validated the item of a seller in the hierarchy, then an "item valid" response is received by the collectible CPO management system 100 from the dealer/authenticator 150 during step 1145. The central controller 200 then instructs the dealer/authenticator 150 to return any items of any other sellers which may be in the possession of the dealer/authenticator 150 during step 1150. The buyer is then instructed to pick up the item from the 150 or the dealer/authenticator 150 is instructed to deliver the item to the buyer during step 155. The seller's credit card is then credited with the CPO price, less authentication and other administrative fees, and the offer database 700 is updated during step 1160 to record the final seller and final item number sold to the buyer, before program control terminates during step 1165.

As previously indicated, the central controller 200 preferably periodically executes an unfilled CPO periodic maintenance process 1200 to determine whether the goods associated with a previously unfilled CPO have been added to the inventory of the collectible CPO management system 100. The unfilled CPO periodic maintenance process 1200 initially checks the item database 800 during step 1210 to determine if a seller has listed an "unfilled item." A test is then performed during step 1220 to determine if a seller has listed the item. If it is determined during step 1220 that a seller has not listed the item, then program control returns to step 1210.

If, however, it is determined during step 1220 that a seller has listed the item, then the buyer is notified that the requested item is now available from at least one seller, during step 1230, and the buyer is asked whether he would like to resubmit his original CPO. A test is then performed during step 1240 to determine if the buyer wishes to resubmit his CPO. If it is determined during step 1240 that the buyer does not wish to resubmit his CPO, then the offer record is cancelled in the offer database 700 during step 1260, before program control terminates during step 1270.

If, however, it is determined during step 1240 that the buyer does wish to resubmit the CPO, then the collectible CPO evaluation process 1000 (FIG. 10) is executed during step 1250 to reinitiate the CPO, before program control terminates during step 1270.

Figure 13:
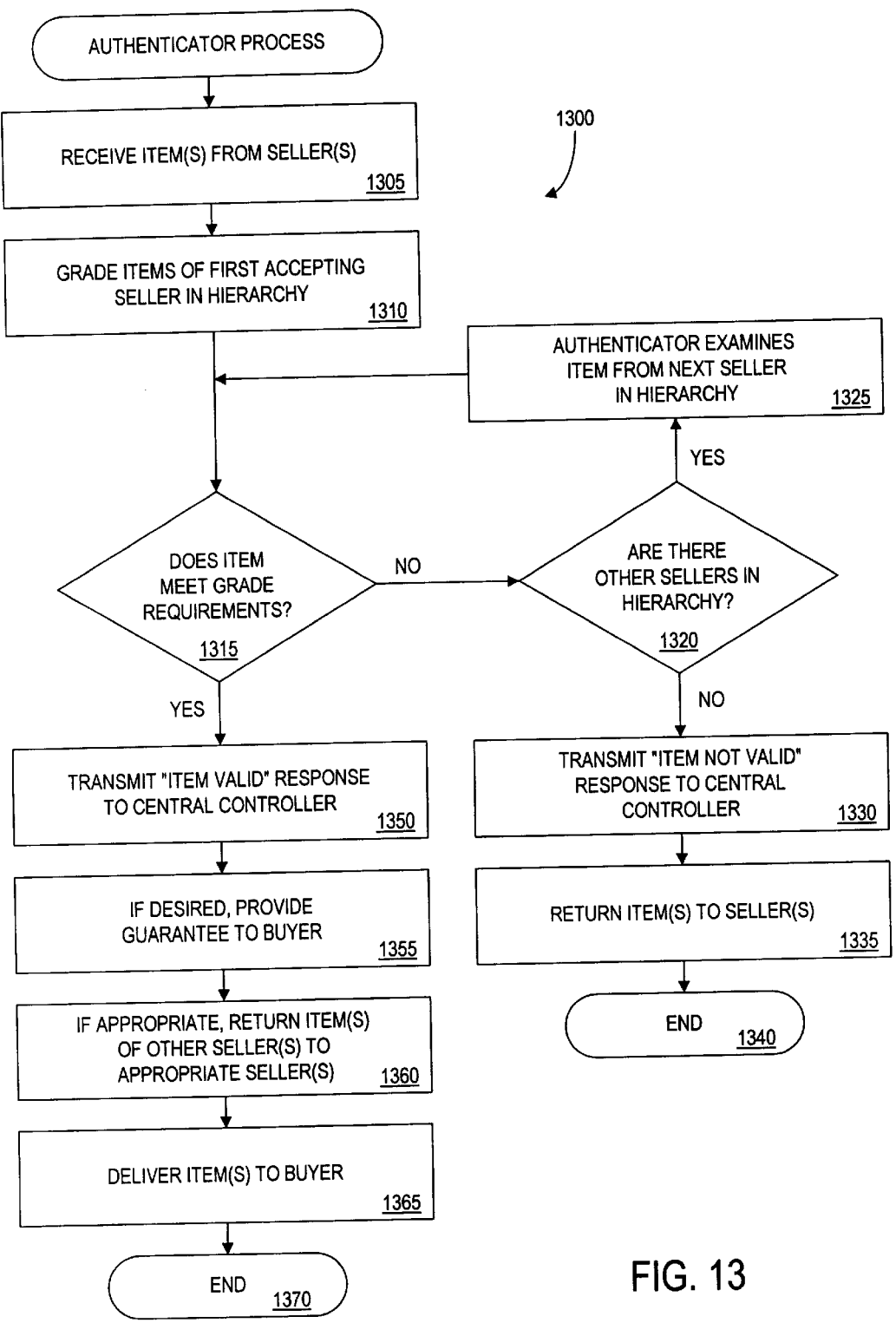
FIG. 13 is a flowchart describing an exemplary process implemented by the dealer/authenticator of FIG. 1.

As previously indicated, the dealer authenticator 150 initiates an authenticator process 1300, shown in FIG. 13, when the the dealer authenticator 150 receives one or more items for inspection during step 1305 from the accepting seller(s) in a hierarchy. The dealer/authenticator 150 then grades the item of the first accepting seller in the hierarchy during step 1310. A test is then performed during step 1315 to determine if the item meets the specified grade requirements. If it is determined during step 1315 that the item does not meet the specified grade requirements, then a further test is performed during step 1320 to determine if there are any additional sellers in the hierarchy. If it is determined during step 1320 that there are additional sellers in the hierarchy, then the dealer/authenticator 150 will examine the item from the next seller in the hierarchy during step 1325, before program control returns to step 1315 and continues processing in the manner described above. If, however, it is determined during step 1320 that there are no additional sellers in the hierarchy, then the dealer/authenticator 150 will transmit an "item not valid" response to the central controller 200 during step 1330. The dealer/authenticator 150 then preferably returns the item(s) to the seller(s) in the hierarchy during step 1335, before program control terminates during step 1340.

Once it is determined during step 1315 that an item from a seller in the hierarchy meets the grade requirements specified by the CPO, the dealer/authenticator 150 will transmit an "item valid" response to the central controller 200 during step 1350. Thereafter, the dealer/authenticator 150 will provide a guarantee to the buyer during step 1355, if desired. The dealer/authenticator 150 will then return any additional items from subsequent sellers in the hierarchy to the sellers, if any, during step 1360. Finally, the dealer/authenticator 150 will deliver the item to the buyer during step 1365, or arrange for the buyer to pick up the item, before program control terminates during step 1370.

Collections

In the illustrative collectibles industry, buyers and sellers are often looking to acquire or sell, as appropriate, an entire collection. Thus, it may be necessary to deconstruct or break up a CPO submitted by a buyer for an entire collection, or a specified percentage of a collection, into component CPOs which are individually offered to sellers. For example, a buyer might specify that he will only purchase a predefined minimum percentage of an entire collection, or that certain items will only be purchased together with another item. The individual component CPOs associated with the overall CPO are processed by the collectible CPO management system 100 to determine whether one or more sellers are willing to accept each of the individual components to complete the desired collection. If each of the individual component CPOs of a collection CPO are accepted by one or more sellers, the collectible CPO management system 100 binds the buyer, on behalf of each of the accepting sellers, to purchase the entire collection. In this manner, a legally binding contract is formed. For a more detailed discussion of a system for deconstructing or breaking up an overall CPO for an entire collection into component CPOs which are individually offered to sellers, see U.S. patent application Ser. No. 08-923683, filed Sep. 4, 1997, entitled "Conditional Purchase Offer (CPO) Management System for Packages," incorporated by reference herein.

Likewise, if a seller only wishes to sell an entire collection, or a specified percentage of a collection, as part of a single transaction, it may be necessary to combine a plurality of individual CPOs for portions of the collection in order to meet the seller's requirements. Thus, the seller can specify, for example, that one or more specified items may only be sold together with another item. The individual CPOs are processed by the collectible CPO management system 100 and pre-bound, until the (entire collection has been sold. If the collectible CPO management system 100 is unable to sell the entire collection within a predefined time period, the individual pre-bound CPOs are preferably cancelled. For a more detailed discussion of a system for aggregating individual CPOs into a group CPO, see U.S. patent application Ser. No. 08-943266, filed Oct. 3, 1997, entitled "System And Method For Aggregating Multiple Buyers Utilizing Conditional Purchase Offers (CPOs)," incorporated by reference herein.

According to a further feature of the present invention, the collectible CPO management system 100 preferably provides an optional agency feature that permits the collectible CPO management system 100 to accept or reject a given CPO on behalf of certain agency-based sellers who have delegated such authority to the collectible CPO management system 100. Thus, the collectible CPO management system 100 preferably (i) evaluates CPOs on behalf of certain agency-based sellers who have delegated authority to the collectible CPO management system 100 to accept or reject a given CPO, and (ii) permits broadcast-based sellers to evaluate CPOs independently. Thus, the collectible CPO management system 100 can preferably provide a CPO to each broadcast-based seller, for the seller to independently determine whether or not to accept a given CPO. It is noted that the collectible CPO management system 100 can provide a CPO to each appropriate broadcast-based seller, for example, by means of a broadcast transmission, or by means of posting the CPO, for example, on an electronic bulletin board accessible by each broadcast-based seller.

Alternatively, the collectible CPO management system 100 can evaluate a CPO against a number of CPO rules defined by one or more agency-based sellers, to decide on behalf of an agency-based seller to accept or reject a given CPO. A CPO rule is a set of restrictions defined by a given agency-based seller, to define a combination of such restrictions for which the seller is willing to accept a predefined minimum price. In addition, CPO rules can include guidelines defined by a given agency-based seller, for filtering CPOs that the seller should receive. For a more detailed discussion of CPC rules, the manner in which they are generated and related security issues, see U.S. patent application Ser. No. 08/889,319, entitled Conditional Purchase Offer Management System, filed Jul. 8, 1997, the parent application to the present invention, which is incorporated by reference herein.

Thus, the collectible CPO management system 100 can determine if one or more sellers accepts a given CPO by providing the CPO to each seller and receiving an acceptance or rejection, or by applying the CPO to the CPO rules to render a decision to either accept, reject or counter a CPO on behalf of a particular seller.

It is to be understood that the embodiments and variations shown and described herein are merely illustrative of the principles of this invention and that various modifications may be implemented by those skilled in the art without departing from the scope and spirit of the invention.

We claim:

1. A method of processing the sale a secondary market item, comprising the steps of:
    obtaining a purchase offer for said secondary market item from a customer, said purchase offer containing a description of said secondary market item and a payment identifier for specifying a general-purpose account from which funds may be paid;
    providing said purchase offer to one or more potential sellers;
    receiving from an accepting seller an acceptance of said purchase offer;
    determining if said secondary market item provided by said accepting seller satisfies said description; and
    binding said customer to purchase said secondary market item if said secondary market item satisfies said description.

2. The method according to claim 1, further comprising the step of initiating the use of said payment identifiers to collect said funds from said customer.

3. The method according to claim 1, wherein said secondary market item is a collectible.

4. The method according to claim 1, further comprising the step of providing said purchase offer to said sellers based on the type of items in the seller's collection.

5. The method according to claim 1, further comprising the step of providing said purchase offer to said sellers if said purchase offer satisfies screening criteria specified by said sellers.

6. The method according to claim 1, wherein acceptances are received from a plurality of accepting sellers and further comprising the step prioritizing said accepting sellers based on predefined criteria.

7. The method according to claim 1, wherein determining step comprises the step of providing said secondary market item to an authenticator for inspection.

8. A method of processing the sale of a secondary market item, comprising the steps of:
    obtaining a purchase offer for said secondary market item from a customer, said purchase offer containing at least one customer-defined condition;
    identifying one or more rules from at least one potential seller of said secondary market item, each of said rules containing one or more seller-defined restrictions;
    comparing said purchase offer to said rules to determine whether an accepting seller is willing to accept said purchase offer if said customer-defined condition satisfies said seller-defined restrictions of at least one of said rules;
    determining if said secondary market item provided by said accepting seller satisfies said condition; and
    providing said secondary market item to said customer if said secondary market item satisfies said condition.

9. The method according to claim 8, wherein said purchase offer further contains a payment identifier for specifying a general-purpose account from which funds may be paid and said method further comprises the step of initiating the use of said payment identifiers to collect said funds from said customer.

10. The method according to claim 8, wherein said secondary market item is a collectible.

11. The method according to claim 8, wherein said rules are identified based on the type of items in the seller's collection.

12. The method according to claim 8, wherein said rules are identified based on screening criteria specified by said sellers.

13. The method according to claim 8, wherein acceptances are received from a plurality of accepting sellers and further comprising the step prioritizing said accepting sellers based on predefined criteria.

14. The method according to claim 8, wherein determining step comprises the step of providing said secondary market item to an authenticator for inspection.

15. A system for processing the sale of a secondary market item comprising:
    one or more communications ports to receive a purchase offer for said secondary market item from a customer, said purchase offer containing a description of said secondary market item and a payment identifier for specifying a general-purpose account from which funds may be paid; and
    one or more processors to determine if said purchase offer is accepted by an accepting seller and if said secondary market item provided by said accepting seller satisfies said description, said customer being bound to purchase said item if an acceptance is received for said purchase offer.

16. The system according to claim 15, wherein said processor initiates the use of said payment identifiers to collect said funds from said customer.

17. The system according to claim 15, wherein said secondary market item is a collectible.

18. The system according to claim 15, wherein said processor provides said purchase offer to said sellers based on the type of items in the seller's collection.

19. The system according to claim 15, wherein said processor provides said purchase offer to said sellers if said purchase offer satisfies screening criteria specified by said sellers.

20. The system according to claim 15, wherein acceptances are received from a plurality of accepting sellers and wherein said processor prioritizes said accepting sellers based on predefined criteria.

21. The system according to claim 15, wherein processor determines if said secondary market item satisfies said description by providing said secondary market item to an authenticator for inspection.

22. A system for processing the sale of a secondary market item comprising:

one or more communications ports for obtaining a purchase offer for said secondary market item from a customer and for obtaining one or more rules from at least one seller of said secondary market item, said purchase offer containing at least one customer-defined condition for said secondary market item and each of said rules containing one or more seller-defined restrictions; and one or more processors to:
compare said purchase offer to said rules to determine whether a seller is willing to accept said purchase offer if said customer-defined condition satisfies said seller-defined restrictions of at least one of said rules; and
provide said secondary market item to said customer if an acceptance is obtained for said purchase offer and if said secondary market item provided by said accepting seller satisfies said condition.

23. The system according to claim 22, wherein said purchase offer further contains a payment identifier for specifying a general-purpose account from which funds may be paid and said processor initiates the use of said payment identifiers to collect said funds from said customer.

24. The system according to claim 22, wherein said secondary market item is a collectible.

25. The system according to claim 22, wherein said rules are identified based on the type of items in the seller's collection.

26. The system according to claim 22, wherein said rules are identified based on screening criteria specified by said sellers.

27. The system according to claim 22, wherein acceptances are received from a plurality of accepting sellers and wherein said processor prioritizes said accepting sellers based on predefined criteria.

28. The system according to claim 22, wherein processor determines if said secondary market item satisfies said description by providing said secondary market item to an authenticator for inspection.

29. A method of processing the sale of a collection of secondary market items, comprising the steps of:

obtaining a purchase offer for said collection from a customer, said purchase offer containing a description of said secondary market items in said collection and a payment identifier for specifying a general-purpose account from which funds may be paid;

deconstructing said purchase offer into a plurality of component purchase offers;

providing said component purchase offers to a plurality of potential sellers;

receiving from one or more of said sellers an acceptance of said component purchase offers;

determining if said secondary market items provided by said accepting sellers satisfy said corresponding description; and binding said customer to purchase said collection if said collection of secondary market items satisfies said description.

30. A method of processing the sale of a collection of secondary market item, comprising the steps of:

obtaining an individual purchase offer for one or more secondary market items in said collection from each of at least two customers, each of said individual purchase offers containing a description of said secondary market items and a payment identifier for specifying a general-purpose account from which funds may be paid;

combining said individual purchase offers to form an aggregate purchase offer for said collection;

providing said aggregate purchase offer to one or more potential sellers of said collection;

receiving from at least one of said sellers an acceptance of said aggregate purchase offer;

determining if said secondary market items provided by said accepting seller satisfies said descriptions; and binding said customers to purchase said secondary market items if said secondary market items satisfy said description.

* * * * *